United States Patent [19]
Borst et al.

[11] 4,090,494
[45] May 23, 1978

[54] SOLAR COLLECTOR

[75] Inventors: Walter L. Borst; Stephen K. Miller; Michael B. Kane, all of Carbondale, Ill.

[73] Assignee: Southern Illinois University Foundation, Carbondale, Ill.

[21] Appl. No.: 761,619

[22] Filed: Jan. 24, 1977

[51] Int. Cl.² .................................................. F24J 3/02
[52] U.S. Cl. ..................................... 126/270; 237/1 A
[58] Field of Search ............... 126/270, 271; 237/1 A; 98/121 R, 121 A; 52/473

[56] References Cited

U.S. PATENT DOCUMENTS

| | | | |
|---|---|---|---|
| 201,439 | 3/1878 | Moreau | 126/270 |
| 3,863,621 | 2/1975 | Schoenfelder | 126/270 |
| 3,996,919 | 12/1976 | Hepp | 126/270 |
| 4,034,736 | 7/1977 | Telkes | 126/270 |

Primary Examiner—Kenneth W. Sprague
Assistant Examiner—James C. Yeung
Attorney, Agent, or Firm—Koenig, Senniger, Powers and Leavitt

[57] ABSTRACT

A solar collector comprising a trough, a solar radiation transmitting cover overlying the trough with one end of the trough constituting an inlet end, with the other end of the trough constituting an outlet end, and with air flowing through the trough from the inlet to the outlet end thereof generally along the longitudinal axis of the trough, and a plurality of solar radiation absorption panels disposed within the trough for absorbing solar radiation transmitted through the cover and for heating the air flowing through the trough. The solar radiation absorption panels extend transversely across the trough and are inclined relative to the longitudinal axis of the trough. Each of these panels has a plurality of louver fins thereon extending from the panel with openings therebetween, each of the louver fins being generally parallel to the direction of the flow of air through said trough and being disposed to intercept and absorb solar radiation transmitted through the cover whereby the air flowing through the trough flows through the openings in the panel and over the louver fins in a direction generally parallel to the longitudinal axis of the trough for being heated by the louver panels and by the fins, thereby to increase the heat transfer efficiency between solar absorber surface (i.e., the louvers) and the flowing air and to simultaneously hold the pressure drop of the air flow at a manageable low level.

14 Claims, 5 Drawing Figures

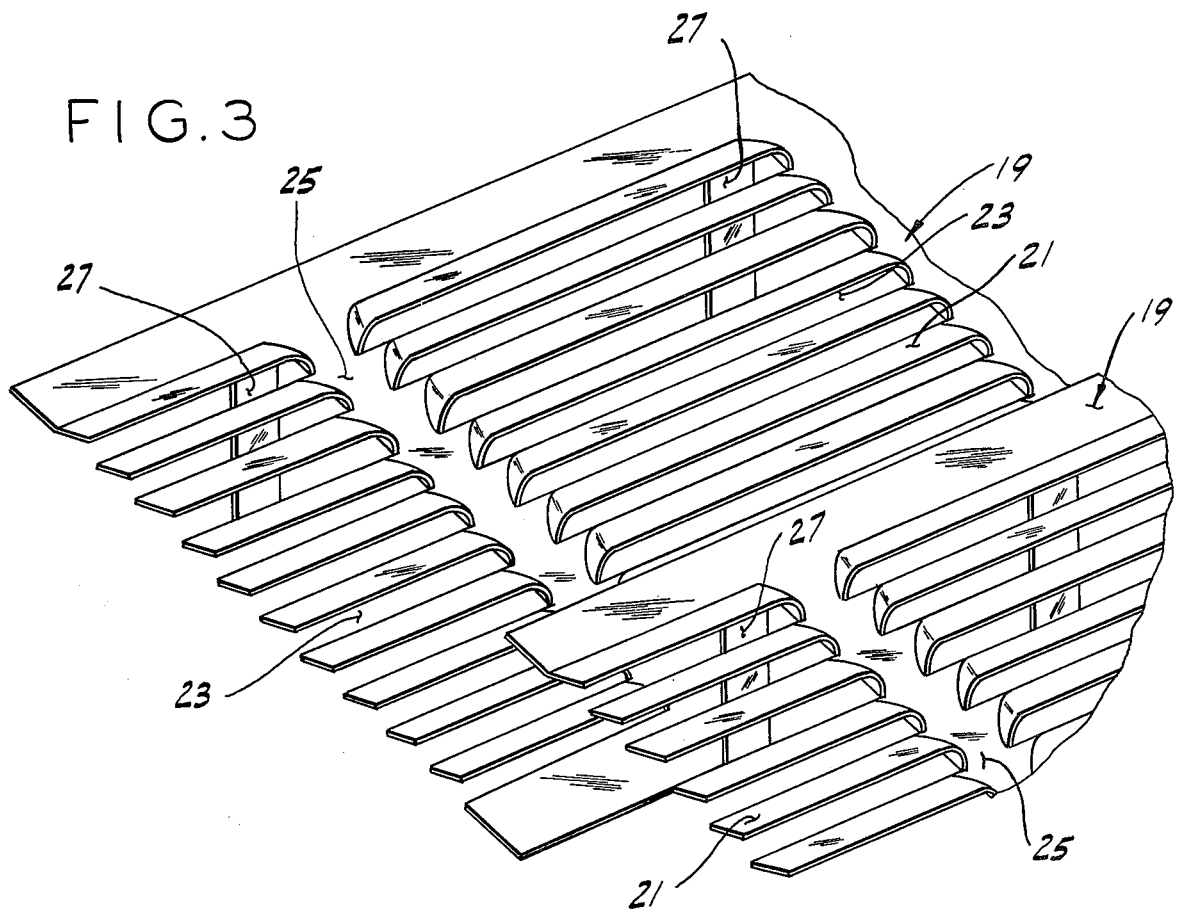
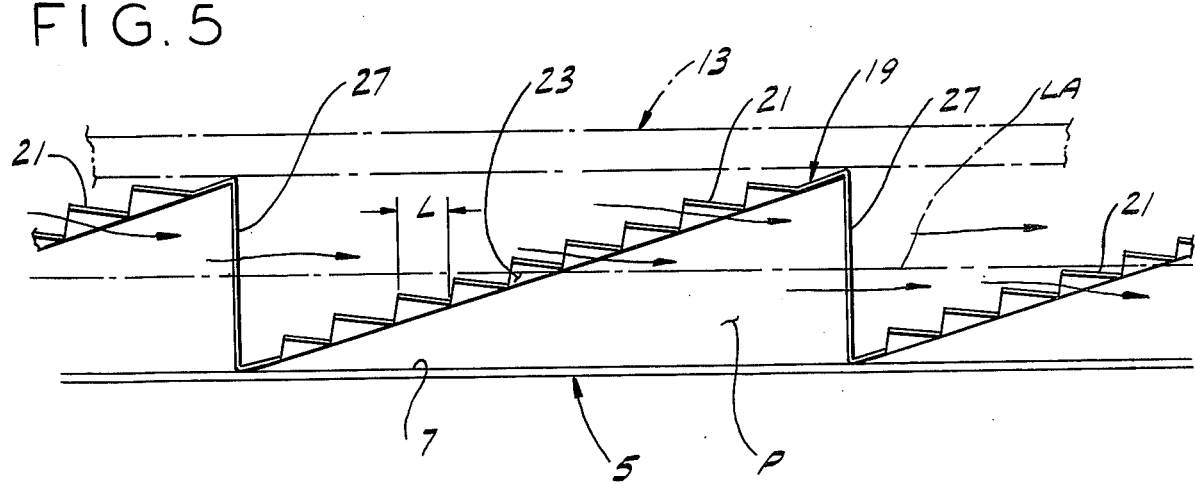

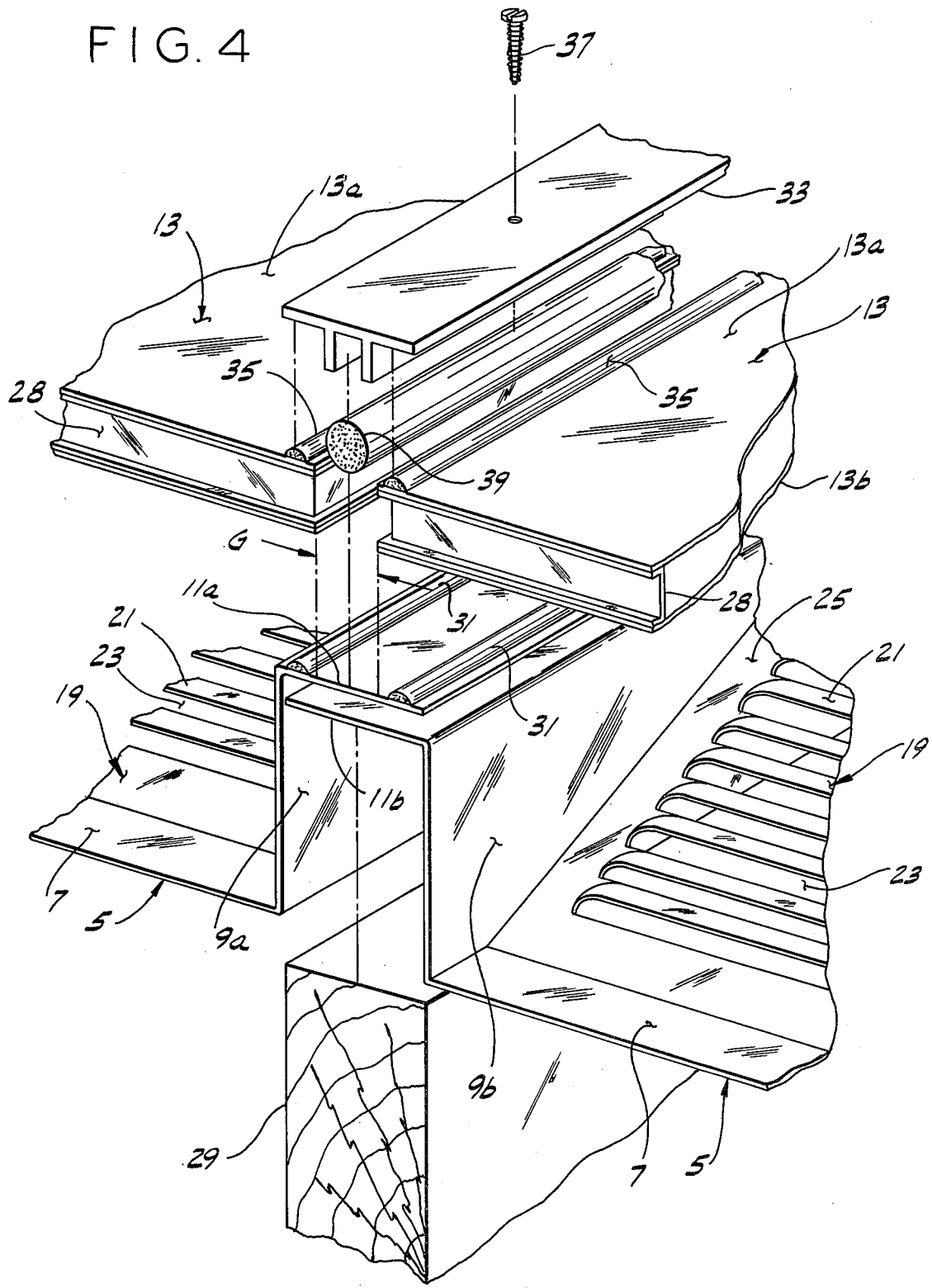

SOLAR COLLECTOR

BACKGROUND OF THE INVENTION

This invention relates to solar heating systems and more particularly to a solar collector system which can be integrally incorporated in a building, such as a single or multi-family residence or commercial building, constructed in accordance with generally recognized building construction practices.

In view of the increasing concern of diminishing supplies and increasing costs of conventional energy forms, solar heating offers an attractive alternate method for heating residences and other types of buildings because of the general availability of solar energy and its non-polluting characteristics. Basically, solar heating systems involve collecting incident solar radiation, transferring this solar radiation into heat energy, and then utilizing this heat energy for heating a building. Here, we are particularly concerned with a non-concentrating immovable solar collector which uses air as the heat transfer medium. Solar collectors, such as above described, are usually installed on a stationary structure, such as on the roof of a house or other building, and are aligned in an optimum direction and at an optimum inclination for intercepting the largest possible percentage of solar radiation available at all times of the solar day and during all times of the heating season. These stationary solar collectors are much less expensive than are movable collectors.

Of course, at any given latitude and at any given time of the day and the year, only a given amount of solar radiation (or insolation as measured in BTU/ft$^2$ hr) strikes the earth's surface. Unfortunately, at higher latitudes where the heating requirements are the highest, there is not only less available insolation in the winter months but the time available for each day for solar heating is descreased (i.e., there is less daylight) thus requiring larger area collectors. Since in most conventional solar heating systems the collectors are a major cost factor, it is highly desirable that the collectors be as efficient as possible so as to decrease their size and numbers required to heat the building.

The solar collector system of the present invention utilizes air as the heat transfer medium. In most prior forced air solar collector systems, solar radiation passes through a transparent panel and is absorbed within the collector by various solar radiation absorption surfaces, such as the walls of the collector or closely spaced cups or other means disposed within the collector. Air is then forced over the absorption surfaces within the collector and is heated by the absorption surfaces. The heated air is then circulated to a large heat sink, such as a large volume of water or crushed rock, where the heated air heats the sink. Air may then be circulated through the sink for being heated thereby and this newly heated air is then circulated through the building for heating purposes. Oftentimes, the heat sink will store sufficient heat to adequately heat the building for several days in the event cloudy weather blocks out solar radiation. Auxiliary heating units in the heating system are usually provided so that in the event solar radiation is not sufficient to heat the building, the auxiliary heaters can be used to augment solar heating.

As previously mentioned, it is highly desirable that a forced air solar collector be as efficient as possible in converting solar radiation into heat energy and in heating the air circulated therethrough. The overall efficiency of the solar collector may be expressed as the ratio of the heat added to the air circulated through the collector in a given period of time compared to the insolation available during that period in the plane of the collector surface. In order to maximize the efficiency of any solar collector, it is desirable that the temperature of the radiation absorption surfaces be as low as possible so as to reduce reradiation and conduction losses from the absorbing surface and thereby to insure that the maximum available amount of heat possible is transferred to the air circulated through the collector. It is also desirable that the ducting losses of the air circulated through the collector be as low as possible so as to reduce the energy required to circulate the air through the collector. It is generally known that in order to increase the transfer of heat to air that the air should be rapidly and turbulently circulated over the heated surfaces thereby to increase the heat transfer coefficient between the air and heated surfaces. This, however, requires a greater expenditure of energy to circulate the air.

Reference may be made to such U.S. Pat. Nos. as 2,680,565 and 3,971,359 which describe solar heating collectors broadly similar to this invention.

SUMMARY OF THE INVENTION

Among the several objects and features of this invention may be noted the provision of a forced air, non-concentrating solar collector system which may be readily integrated into buildings constructed in accordance with generally recognized building construction practices; the provision of such a solar collector which has a high overall efficiency rating and yet which has little restriction to the flow of air therethrough; the proyision of such a solar collector system which serves as both a weatherproof roof surface and as a structural sheathing for the roof for the building on which it is installed; the provision of such a solar collector system which minimizes thermal losses by reradiation and conduction to the environment; the provision of such a solar collector system which is light in weight; and a provision of such a solar collector system which is of rugged and simple construction, which has no moving parts, which can be fabricated with conventional tooling, which has a long service life, and which is virtually maintenance-free.

Briefly, a solar collector of this invention comprises an inclined trough, a solar radiation transmitting cover overlying the trough and enclosing the latter thereby to constitute air passageway through the trough with the bottom end of the trough constituting an inlet end, with the upper end of the trough constituting an outlet end, and with air flowing through the trough along the longitudinal axis thereof from the inlet to the outlet end thereof, and solar radiation absorption means disposed within the trough for absorbing solar radiation transmitted through the cover and for heating the air flow through the trough. The solar radiation absorption means comprises a plurality of louver panels disposed within the trough, each of these louver panels extending transversely across the trough and being inclined relative to the longitudinal axis of the trough. Each of the louver panels further has a plurality of louver fins extending from the louver panel with openings therebetween. Each of the louver fins is generally parallel to the direction of the flow of air through the trough and is disposed to intercept and absorb solar radiation transmitted through the cover whereby the air flows through the louver openings and over the louver fins in a direction generally parallel to the longitudinal axis of the trough for being heated by the louver panels and the fins with only a small restriction of the flow of air through the trough. Other objects and features of this invention will be in part apparent and in part pointed out hereinafter.

BRIEF DESCRIPTION OF THE DRAWINGS

FIG. 3 is an enlarged perspective view of a solar absorption panel of the solar collector of this invention;

FIG. 4 is an enlarged exploded perspective view of a portion of the solar collector system of this invention illustrating how adjacent collectors are installed on the roof structural members of a building; and FIG. 5 is an enlarged longitudinal cross-section of a portion of a collector of this invention.

Corresponding reference characters indicate corresponding parts throughout the several views of the drawings.

DESCRIPTION OF A PREFERRED EMBODIMENT

Figure 1:
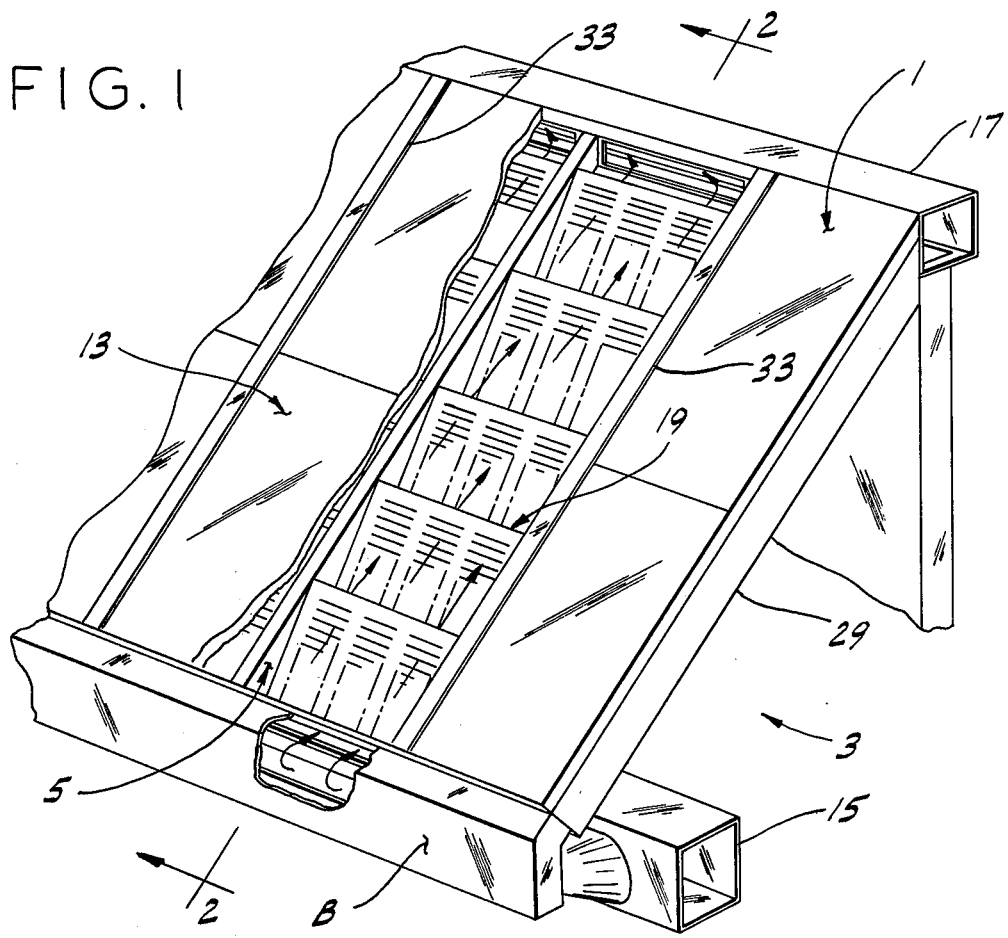
FIG. 1 is a perspective view of a portion of a roof having a solar collector system of this invention incorporated therein with portions of the collector covers removed to show details of the collectors.

Referring now to the drawings, a solar collector system of this invention is shown to include a plurality of solar collectors 1 incorporated in the roof 3 of a building, such as in the roof of a house, which is constructed in accordance with generally recognized building construction practices. Solar collectors 1 may generally be characterized as fixed position, non-concentrating solar collectors which absorb incident solar radiation and heat air therewithin.

Figure 2:
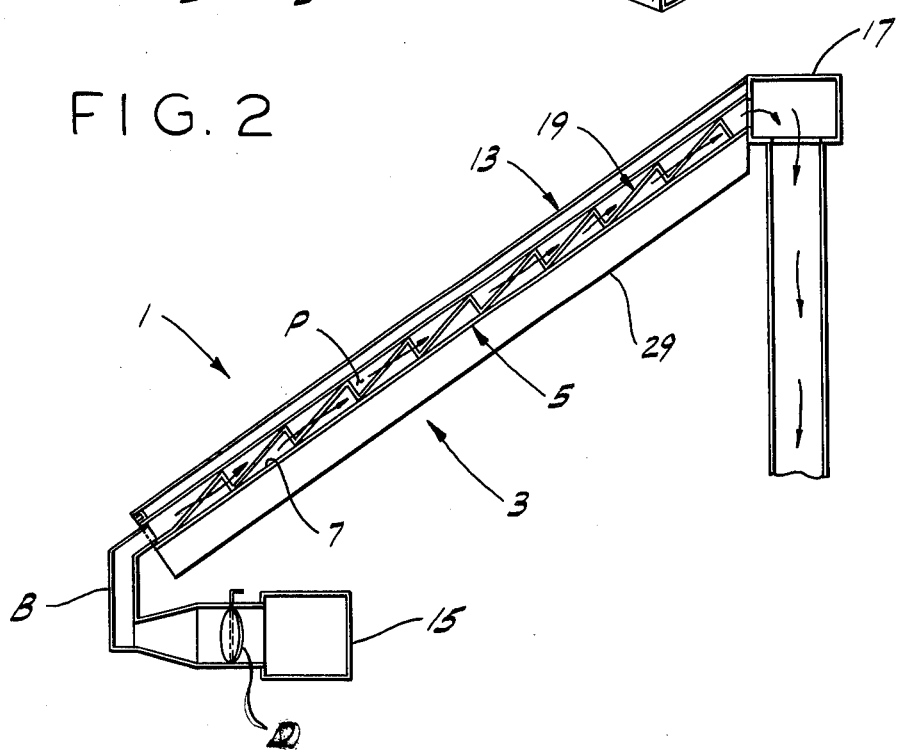
FIG. 2 is a vertical cross-section taken along line 2—2 of FIG. 1.

Each collector 1 comprises a trough or tray 5 made of sheet metal or the like. The trough is generally channel-shaped in cross-section and has a flat bottom 7 and opposite side walls 9a, 9b (see FIG. 4). Each of the side walls has an outwardly extending flange 11a, 11b, respectively, for purposes as will appear. A solar radiation transmitting cover, generally indicated at 13, overlies the open through and encloses the spaces therewithin the defined an air passageway P (see FIG. 2) extending lengthwise of the trough. As best shown in FIG. 2, collectors 1 are normally inclined at the same angle as roof 3 of the building on which they are installed. Preferably, the inclination and direction of the roof of the building incorporating solar collectors 1 of this invention is such that the solar collectors have an optimum compass orientation and inclination angle so as to intercept an optimum amount of direct solar radiation during the heating season. Generally, a solar collector in the northern hemisphere should face in a generally southerly direction. The angle of inclination of the collectors will vary, depending on the latitude in which the collector is located.

As shown in FIGS. 1 and 2, the lower ends of the collector trays 5 are in communication with an inlet air plenum 15 and constitutes an inlet end for the collector and the upper ends of the collector trays constituting an outlet end are in communication with an outlet air plenum 17. Thus, air may be ducted into plenum 15 by a blower (not shown) to be distributed to the lower or inlet ends of each of the collector trays of the collector system of this invention to flow generally longitudinally through air passageway P in each of the collector trays and to be collected in outlet plenum 17. It will be appreciated that air flow between the inlet and outlet plenums and through the side-by-side collector trays is generally parallel air flow. As is shown in FIG. 2, inlet air plenum is on the inside of the building roof and is mounted on the underside of the roof members. A boot B interconnects plenum 15 and the inlet end of each of the trays and a damper D is provided for regulating the flow of air to each tray. As is conventional with forced air solar heating systems, the air heated by the collector is directed from outlet plenum 17 to a heat sink (not shown), such as a large mass of crushed rock enclosed in an insulated chamber located, for example, in the basement of the building. This heat sink typically has passages incorporated therethrough through which heated air from the collectors may be circulated to heat the heat storage mass. Air can be circulated through the heat sink storage mass to be heated at a later time so that this heated air can then be circulated into the building to heat the latter. It is, of course, well known to incorporate an auxiliary heater, such as a gas or oil fired unit and with appropriate thermostatic controls, in a solar heating system to augment solar heating and to automatically control the temperature within the building.

In accordance with this invention, solar radiation absorption panels 19 are incorporated in the passageway P of each trough 5 for absorbing solar radiation transmitted through cover 13, to transform into heat energy, and to efficiently heat the air flowing through the passageway. The solar radiation absorption panels are shown to be a series of sheet metal louvered panels, each of which extends transversely across trough 5 between side walls 9a, 9b and which extends up from the bottom 7 of the trough to the upper edges of the side walls in close proximity to the bottom face of cover 13. The panels are each inclined relative to the longitudinal axis LA of the trough with the upper ends of the end panels inclined toward the outlet or upper end of the trough. Each louver panel 19 has a plurality of louver fins 21 extending therefrom with openings 23 therebetween. As previously mentioned, louver panels 19 are preferably made of sheet metal or the like and louver fins 21 are punched therefrom to extend transversely across the panel and to be generally parallel to one another. The fins are generally flat, and, as shown in FIG. 5, are generally parallel to the longitudinal axis LA of collector trough 5 and extend out from the front face of the panel. In other words, these fins are generally parallel to the inner face of the cover parallel to the direction of the flow of air through the passageways. Openings 23 are formed by the vacant spaces left by the fins struck from the sheet metal panels. With collectors 1 being inclined at the above discussed optimum inclination angle, the louver fins are disposed generally at right angles to the solar radiation striking the collector under optimum conditions.

In accordance with this invention, louver fins 21 are so sized and positioned that nearly all of the solar radiation transmitted through cover 13 is absorbed by the fins and the openings 23 are so sized as to insure that the flow of air through the collector trough is in good heat transfer relation with the louver panels and with the louver fins for readily transferring heat from the louver panels and fins to the air and yet so that the flow of air through the trough is not substantially restricted. As heretofore pointed out, the object of insuring good heat transfer between the absorption surfaces of the collector and the air heated thereby and the object of minimizing the flow resistance to the air through the panel often run counter to one another. In order to provide both a good solar radiation absorption surface and to permit the air to flow freely through the collector with little restriction, openings 23 in the louver panels preferably constitute a relatively large percentage of the cross-sectional area of trough 5. The length L (see FIG. 5) of the louver fins, as measured in the direction of the longitudinal direction of the flow of air through the trough, is preferably maintained within a desired range so that the fins have adequate surface as to intercept most of the radiation striking the collector. It will be understood that the fins of the collector of this invention are so sized that they do not shade one another. The fins also must provide adequate surface area to transfer heat to the air moving through the collector and the openings between the fins must be small enough so as to insure that the flow of air through the collector is sufficiently turbulent (even at relatively low flow velocities, for example, less than 100 feet per minute) so as to insure good heat transfer from the heated louver panels to the air but without imposing high pressure drops within the collector. The width of louver fins 21 in the direction between the trough side walls 9a, 9b is as long as possible. The length L of fins 21 in the direction of the air flow preferably ranges between about ⅛ and ⅝ inches, and even more preferably ranges between about ¼ and ½ inches. As shown in the drawings, the louver openings are arranged in three sets extending transversely across the louvered panels with a bridging section 25 between the sets. These bridging sections are desirably sized so as to give sufficient structural support to fins 21, but maximize the amount of the panel having fins 21 and openings 23 therein. It will be understood that any other desired arrangement or grouping of the louvered slots in the panel may be used. With louver panels 19 constructed as above-described, a majority of the solar radiation passing through cover 13 is absorbed by fins 21 and the air flowing through passageway P passes freely through openings 23.

As heretofore mentioned, louver fins 21 are generally parallel to the longitudinal axis LA of trough 5. These fins may, however, be so arranged to at least partially deflect the flow of air downwardly away from the inner face of cover 13 while still permitting the air to flow through the collector in a direction generally parallel to the longitudinal axis of the collector trough. By slightly deflecting the air downwardly away from the inner face of cover 13, the thermal losses to the cover may be minimized.

Louver panels 19 are preferably made in modules or units incorporating several louver panels arranged one after the other. The modules are designed to fit within trough 5 and to be secured (e.g., riveted) to the trough as a unit. The tops of the louvered panels are connected to the next adjacent upper louver panel in the module by legs 27, the latter being spaced relatively far apart from one another with large openings therebetween through which the air may flow substantially without restriction by the legs. In this manner, the panels may be installed in their respective troughs as a unit with the arrangement and spacing of the individual louver panels of the unit being preestablished. This greatly reduces the assembly time of the collector of this invention. Bridging portions 25 and legs 27 may be crimped along their length to resist longitudinal bending.

It, of course, will be understood that all surfaces of louver panels 19 and the inner surfaces of trough 5 are preferably highly absorptive to solar radiation. For example, these surfaces may be painted with a conventional high absorptivity paint, such as is commercially available from the Minnesota Mining and Manufacturing Company of Minneapolis, Minnesota under their trade designation 3M BLACK NEXTAL. Thus, these surfaces have a flat black surface which is highly absorptive to solar radiation.

Cover 13 preferably includes a pair of spaced panes 13a, 13b substantially transparent to solar radiation. These panes are held together by a structural peripheral frame 28 (see FIG. 4). Panes 13a, 13b are separated by one another to provide a dead air space therebetween for thermally insulating the panes from one another. As shown in FIG. 4, panes 13a, 13b are joined by frame 28 in a unitary panel which has a width somewhat greater than trough 5 so that the side margins of the cover overlie side flanges 11a, 11b of the trough for purposes as will appear. While any suitable material may be used for panes 13a, 13b the material should have a relatively high transmissivity factor so that the maximum amount of insulation striking the panel is transmitted into the trough 5 for heating the air flowing therethrough. The cover should also have adequate structural strength to withstand snow and wind loading on the roof, and have adequate weather resistance to serve a double function as the weather surface for the roof. Preferably, cover 13 is a commercially available unit sold by Kalwal Corporation of Manchester, New Hampshire. It will be understood that in applications where snow loading and thermal insulation of the covers is not a concern, a single pane cover may be used.

Further in accordance with this invention, solar collectors 1 form an integral part of the roof structure of a building built in accordance with generally recognized building construction practices. As shown in FIG. 1, roof 3 includes inclined roof members 29, such as the upper chords of a wood roof truss or the like. As is typical, these roof members are equally spaced from one another. For example, the roof members may be spaced on 24 inch centers and may be of $2 \times 8$ lumber. Inlet and outlet plenums 15 and 17 are incorporated in the roof. Collector troughs 5 are so sized that they fit closely between adjacent roof members 29 with their flanges 11a, 11b fitting on the upper edges of the roof members. As is shown in FIG. 4, the flanges of adjacent collector trays may be overlapped on the upper surface of the roof members. Covers 13 are then installed over their respective trough so that the edges of cover frame 28 are so supported on flanges 11a, 11b with a gap G between the side edges of adjacent covers. Covers 13 for each trough may be as long as the trough, or, as shown in FIG. 1, may be shorter than the trough and a plurality of these shorter covers may be sealingly secured together in end-to-end abutting relation to extend the length of the trough. While the collectors have been above-disclosed incorporated in a conventional frame building, it will be understood that the collectors may be readily incorporated in virtually any conventional building in a manner that would be apparent to a skilled artisan.

As heretofore mentioned, the solar collectors of this invention also constitute the weather surface for roof 3 in the area of the roof that the collectors cover. It is therefore necessary to seal the collectors relative to the building roof so as to keep weather and water out of the building and to seal the covers relative to collector troughs 5 to prevent the escape of heated air flowing through the troughs and to prevent water or other contaminants from entering the trough. A seal 31, such as a continuous bead of a commercially available silicone caulking compound, is provided between flanges 11a, 11b and the side margins of cover 13 to both seal the cover relative to the trough and to be least partially bond the cover in place overlying the trough. As is shown in FIG. 4, batt strip 33 of extruded aluminum or the like overlies the adjacent sides of adjacent covers 13 and spans gap G therebetween. Batt strip 33 is sealed to the covers by beads of sealant 35 applied to the outer faces of the cover frame. The batt strips are then positively secured to roof members 29 by screws 37 inserted through the batt strips and the overlapped flanges 11a, 11b of the collector troughs and into the roof members. The screws firmly clamp the covers 13 to the roof members and secure the troughs to the roof members. Thus, the covers constitute a structural sheathing for the roof of the building. The upper and lower ends of covers 13 are sealed relative to the roof structure by any suitable conventional flashing technique. A center weatherproofing or sealant strip 39 is held in position in a groove 41 on the under face of the batt strip. The center insulation strip seals screws 37 as the latter are inserted therethrough.

EXAMPLE

Efficiency measurements have been conducted on the solar collector of this invention wherein collector trough 5 was about 24 inches wide and 2 ⅜ inches deep. The collector was tested in Southern Illinois at a latitude of about 38° N. The collector was oriented to face south and was inclined to the horizontal at an inclination angle of about 55°. The air flow through the conductor was regulated to be about 4.4 cubic feet per minute per square foot of collector area. The transmissivity factor of cover 13 was determined to be about 0.76. The heat output of the collector for unit time was determined by measuring the average flow rate of the air circulated through the collector trough and by measuring the difference in temperature of the air entering and exiting the collector trough. The instantaneous efficiency e of the collector may be calculated from the following equation:

$$e = C_p \dot{m} \Delta T / A_c S$$

where $C_p$ is the specific heat of air, $\dot{m}$ is the mass flow rate of the air, and $\Delta T$ is the difference between the inlet and outlet air temperatures, $A_c$ is the collector area, and S is the isolation in the collector plane at the time in question. It was found that the peak efficiency of the collector was about 69% during normal incidence of solar radiation and its average efficiency was about 66% for an entire sunny day. It should be noted, however, that the transmissivity fact of the cover was about 0.76 and thus the indicated maximum possible efficiency of the collector was 76%. Thus, the measured maximum efficiency of the collector was about 92% of the maximum possible efficiency when the transmissivity of the cover was taken into account. The maximum outlet air temperature was measured to be about 110° with an inlet air temperature of about 60° and thus the outer surfaces of the collector trough exposed to atmospheric air were relatively cool and thus decreased conduction and reradiation heat losses to the atmosphere.

The same tests were conducted with the same collector trough 5 but the louvered panels 19 were removed. The inside of the trough was, of course, a highly absorptive surface. Here the measured maximum efficiencies of the collector was found to decrease to about 40–50%.

The pressure loss or drop in the flow of air through a 12 feet long collector of the invention at an average velocity of about 100 feet per minute was measured to be about 0.1 inches of water. This pressure drop is low compared to other flow restrictions in the air circulation system and thus the solar absorption panels 19 within the trough impose little restriction of the flow of air through the collector of this invention.

In view of the above it will be seen that the several objects of the invention are achieved and other advantageous results attained.

As various changes could be made in the above methods without departing from the scope of the invention, it is intended that all matter contained in the above description or shown in the accompanying drawing be interpreted as illustrative and not in a limiting sense.

What is claimed is:

1. A solar collector comprising a trough, a solar radiation transmitting cover overlying the trough and enclosing the latter thereby to constitute an air passageway through the trough with one end of the trough constituting an inlet end, with the other end of the trough constituting an outlet end so that air may flow longitudinally through the trough from the inlet to the outlet end thereof, and solar radiation absorption means disposed in the air passageway in said trough for absorbing solar radiation transmitted through the cover and for heating the air flowing through said trough, said solar radiation absorption means comprising a plurality of louvered panels disposed within said trough, each of said louvered panels extending transversely across the trough and being inclined relative to the longitudinal axis of the trough, each of said louvered panels further having a plurality of louver fins extending from one face of the louvered panels with openings therebetween, each of said louvered fins being generally parallel to the direction of the flow of air through said trough and being disposed to intercept and absorb solar radiation transmitted through said cover whereby said air flows through said louver openings and over said louver fins in a direction generally parallel to said longitudinal axis of said trough for being heated by said louvered panels and by said fins substantially without restriction to the flow of air through said trough.

2. A solar collector as set forth in claim 1 comprising a plurality of said troughs in side-by-side relation, a first plenum in communication with the inlet end of each of said troughs and an outlet plenum in communication with the outlet end of each of said troughs whereby air may be ducted from said inlet plenum into each of said troughs for being heated as it flows through the louver panels therein and whereby the heated air may be collected by said outlet plenum.

3. A solar collector as set forth in claim 1 wherein said trough is channel-shaped in cross-section having a bottom and side walls on opposite sides of the bottom, said cover being mounted on the upper ends of the side walls and extending across the trough, and wherein each of said louvered panels extends transversely between said side walls and is inclined upwardly in the direction of the flow of air through the trough from the bottom of the trough to the cover whereby substantially all of the air flowing through the trough must pass through said openings in said louvered panels.

4. A solar collector as set forth in claim 3 wherein the length of said fins on said louver panels ranges between about ⅛ inch and ⅝ inches.

5. A solar collector as set forth in claim 3 wherein said louver fins are so positioned relative to the direction of air flowing through said trough as to deflect said air away from said cover and toward the next louvered panel whereby said air flows substantially parallel to the longitudinal axis of the trough or is angled slightly toward the bottom thereof.

6. A solar heating collector system integrated into a building, the latter having an inclined roof oriented to intercept direct solar radiation and having a plurality of roof frame members spaced equidistantly from one another and inclined generally at the angle of the roof, said collector system comprising a plurality of elongate channel-shaped troughs adapted to fit between and to be supported by adjacent roof frame members, a solar radiation transmitting cover overlying each of the troughs, said cover and said troughs defining an inclined passageway with each said trough generally parallel to the inclination angle of the roof, an air inlet plenum at the lower ends of the troughs in communication therewith and an outlet plenum at the upper ends of the troughs in communication therewith whereby air may be simultaneously ducted in parallel relationship through each of said troughs, each of said collectors having a plurality of louvered panels disposed therewithin for absorbing solar radiation passing through said cover and for heating said air flowing through said trough, each of said louvered panels extending generally transversely across its respective said trough and being inclined relative to the general direction of the flow of air through said through, each of said louvered panels having a plurality of louvered fins extending from the plane of the louvered panel in a direction generally parallel to the flow of the direction of air through the trough with openings in the louver panel adjacent each said fin whereby solar radiation transmitted through said cover strikes said panels and said fins and is absorbed thereby and air flowing through said trough flows through said openings and over said fins in a direction generally parallel to the longitudinal axis of said trough for being heated by said louvered panels and by said fins.

7. A solar heating collector system as set forth in claim 6 further including means for securing said trough to said frame members with said covers constituting sheating members structurally interconnecting said roof frame members.

8. A solar collector system as set forth in claim 6 further comprising means for sealing said covers to said roof frame members for preventing air flowing in said troughs from escaping and for providing a weather-proof surface for the roof.

9. A solar heating collector system as set forth in claim 8 wherein said cover comprises a pair of parallel solar transmitting panels with the space therebetween for reducing thermal conduction losses through the cover from the inside of the trough to the outside air.

10. A solar heating collector system as set forth in claim 8 wherein each of said troughs has an outwardly extending flange at each side thereof adapted to fit on the upper face of a respective roof frame member and to be secured thereto, said cover being comewhat wider than the said troughs so that the side margins of the cover are supported on said side flanges of the trough with seal means between the cover and the trough side flanges.

11. A solar heating collector system as set forth in claim 10 further comprising an elongate batt strip adapted to overlie each of said roof frame members and to span between the adjacent side margins of adjacent covers, and fastener means adapted to secure said batt strips to said roof frame members.

12. A solar collector as set forth in claim 1 wherein two or more of said louvered panels are joined together in end-to-end relation as a unit with the spacing between the panels in said unit and the inclination of the panels in said unit relative to one another being fixed relative to one another whereby upon installation of said unit in said trough the inclination of the louvered panels relative to the longitudinal axis of the trough and the spacing of the panels relative to one another is established.

13. A solar collector as set forth in claim 12 wherein one of said panels of said unit constituting a lower panel extending down from its upper end to the bottom end of the next adjacent upper panel in the unit with relatively wide openings between said legs, the latter interconnecting the adjacent panels of the unit and permitting air to flow through the trough substantially without restriction by the legs.

14. A solar collector as set forth in claim 3 wherein the solar absorption surfaces of said panel have a relatively high solar radiation absorptivity factor.

* * * * *